(12) United States Patent
Rapp et al.

(10) Patent No.: US 7,788,908 B2
(45) Date of Patent: Sep. 7, 2010

(54) FUEL INJECTION SYSTEM HAVING REDUCED POLLUTANT EMISSIONS

(75) Inventors: Holger Rapp, Ditzingen (DE); Udo Schulz, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 169 days.

(21) Appl. No.: 12/065,023

(22) PCT Filed: Jul. 21, 2006

(86) PCT No.: PCT/EP2006/006450

§ 371 (c)(1),
(2), (4) Date: Feb. 27, 2008

(87) PCT Pub. No.: WO2007/025803

PCT Pub. Date: Mar. 8, 2007

(65) Prior Publication Data

US 2008/0236554 A1    Oct. 2, 2008

(30) Foreign Application Priority Data

Aug. 30, 2005    (DE) ...................... 10 2005 040 918

(51) Int. Cl.
*F01N 3/00* (2006.01)
(52) U.S. Cl. .............................. 60/286; 60/295; 60/297; 60/303
(58) Field of Classification Search .................... 60/286, 60/295, 303, 297, 299, 311
See application file for complete search history.

(56) References Cited

U.S. PATENT DOCUMENTS

| | | | |
|---|---|---|---|
| 5,771,689 A | 6/1998 | Bareis et al. | |
| 5,806,497 A * | 9/1998 | Hosoya | 123/494 |
| 2004/0016421 A1 | 1/2004 | Mattes | |
| 2005/0247048 A1 * | 11/2005 | Schaller et al. | 60/286 |
| 2006/0185647 A1 * | 8/2006 | Rapp | 123/446 |
| 2007/0180818 A1 * | 8/2007 | Matsuoka et al. | 60/286 |

FOREIGN PATENT DOCUMENTS

| | | |
|---|---|---|
| DE | 196 25 447 A1 | 1/1998 |
| EP | 1 359 306 A2 | 11/2003 |
| FR | 2 879 241 A1 | 6/2006 |
| GB | 2 357 047 A | 6/2001 |
| WO | WO 02/43840 A1 | 6/2002 |
| WO | WO 243840 A1 * | 6/2002 |
| WO | WO 2005/010351 A1 | 2/2005 |
| WO | WO 2005010351 A1 * | 2/2005 |

* cited by examiner

*Primary Examiner*—Thomas E Denion
*Assistant Examiner*—Diem Tran
(74) *Attorney, Agent, or Firm*—Ronald E. Greigg

(57) ABSTRACT

A fuel injection system for an internal combustion engine is proposed. The fuel injection system has a high pressure part and a low pressure part. In the high pressure part, fuel is fed from at least one high pressure accumulator/reservoir to at least one fuel injector. In the low pressure part, the at least one fuel injector is connected to at least one low pressure accumulator/reservoir, wherein a pressure is maintained in the at least one low pressure accumulator by at least one pressure holding valve. Furthermore, the fuel injection system has at least one device for the after-treatment of exhaust gases of the internal combustion engine in an exhaust gas section. Furthermore, the fuel injection system has at least one metering device for the metered introduction of fuel into the exhaust gas section. Said at least one metering device is connected hydraulically to the at least one low pressure accumulator.

20 Claims, 1 Drawing Sheet

FUEL INJECTION SYSTEM HAVING REDUCED POLLUTANT EMISSIONS

CROSS-REFERENCE TO RELATED APPLICATION

This application is a 35 USC 371 application of PCT/EP 2006/064520 filed on Jul. 21, 2006.

BACKGROUND OF THE INVENTION

1. Field of the Invention

The invention relates to a fuel injection system for internal combustion engines, in particular for direct-injection internal combustion engines, which compared to conventional fuel injection systems has reduced pollutant emissions. Fuel injection systems of this kind can be used particularly for internal combustion engines in the automotive industry, in the field of utility vehicles.

2. Prior Art Description of the Prior Art

In internal combustion engine technology, direct-injection internal combustion engines are being used increasingly, particularly in the field of diesel engines. In them, fuel from a fuel tank is fed via a high-pressure pump system into a high-pressure reservoir (common rail), which in turn is in communication with one or more fuel injectors for injecting the fuel into the combustion chamber of the engine.

As exhaust gas standards become increasingly stringent and given the constant attempt to reduce environmental pollution, numerous systems for posttreating exhaust gases from these internal combustion engines are already being used. Examples that can be mentioned in particular are particle filters, catalytic converters, or combinations of such systems. These systems for posttreating the exhaust gases, however, are often linked with the disadvantage that regular regeneration of the systems is necessary, in order to remove particles, especially soot particles, that have collected in these systems. This regeneration can be done for instance by means of brief temperature elevations, in which particles in the exhaust gas cleaning systems are oxidized and thus removed from the exhaust gas cleaning systems. Typically, stored NOx is reduced by means of uncombusted hydrocarbons.

A known method in the prior art for posttreating exhaust gases is disclosed in German Patent Disclosure DE 198 30 275 A1. This provides a device for posttreating exhaust gases, in the form of a reducing catalytic converter for reducing NOx components of an exhaust gas stream. Diesel fuel is used as the reducing agent; through a special injection nozzle disposed in the exhaust gas tube, it is introduced in such a way that it is aimed in a thin stream at the opening of the outlet valve that opens after a cycle of the engine. By "cracking" and evaporation, the fuel thus introduced is prepared as a reducing agent for reducing the NOx components of the exhaust gas that are stored in the reducing catalytic converter.

The method disclosed in DE 198 30 275 A1 for reinforcing exhaust gas preparation is one example of a so-called postinjection method. Such injection concepts with postinjections to support exhaust gas preparation and/or the regeneration of the systems for exhaust gas preparation, however, have the disadvantage that the postinjection must be controlled chronologically extremely precisely. The postinjection is effected either through the fuel injection valve itself or, as in the case of DE 198 30 275 A1, through a special injection nozzle.

However, if the postinjection quantity is introduced into the engine too soon, it already combusts in the engine, so that on the one hand the exhaust gas temperature is affected in an unwanted way, and on the other, the desired supporting and/or preparing effect of the system is lost for the prose of exhaust gas preparation. If an injection is too late, conversely, the desired cracking effect does not ensue, and thus the postinjection quantity strikes the cylinder wall, for instance, and rinses off the film of lubricant located there and causes the lubricating oil to be diluted with diesel fuel. Thus if injection is too early, the exhaust gas is worsened, and if a postinjection is too late, there is increased wear in the engine because of poorer lubrication. In an extreme case, this latter factor can cause so-called "racing" of the engine from uncontrolled combustion of lubricating oil containing a large amount of diesel fuel.

A remedy to these problems could be provided by making the postinjection not into the combustion chamber but rather directly into the hot exhaust system of the engine. In such concepts, work is done by way of a separate low-pressure injection valve preceded by an electrically actuated metering pump. Such systems are also known as HCI systems (for hydrocarbon injection). With such engines, the possibility also exists of making do in the engine control unit with single-bank injection stage concepts rather than two-bank injection stage concepts, since the late postinjections via the injectors into the engine are omitted. Thus the costs for both electronics and materials are less, and a power loss of the engine control unit is reduced. In addition, the quantity required from the high-pressure pump is reduced, thus making it possible to use smaller pumps as well, in particular single-plunger pumps. The power losses from the requisite generation of high pressure are accordingly less.

Nevertheless, such HCI systems have the disadvantage of requiring complicated additional components. In particular, a separate low-pressure injection valve preceded by an electrically actuated metering pump is necessary. The use of such complicated metering pumps with corresponding electrical control is a particular factor making such HCI systems expensive in terms of space and cost.

SUMMARY AND ADVANTAGES OF THE INVENTION

A fuel injection system is therefore proposed which overcomes the disadvantages of the systems for supporting exhaust gas preparation known from the prior art and that can be realized in a simple way. A fundamental concept of the present invention is to modify the concept, known from the HCI systems, such that the use of a metering valve can be dispensed with. A fundamental idea is to modify the low-pressure region, which is included anyway in many internal combustion engines, in such a way that it serves at the same time to subject the metering valve to pressure, as a result of which the low-pressure pump can be omitted.

The fuel injection system has a high-pressure part and a low-pressure part; in the high-pressure part, fuel from at least one high-pressure reservoir can be delivered to at least one fuel injector. In the low-pressure part, which may embodied in particular as a leak fuel return, the at least one fuel injector is in communication with at least one low-pressure region. For instance, it may be a so-called "leak fuel rail".

A further fundamental concept of the invention is to provide at least one pressure maintenance valve in the at least one low-pressure reservoir. Low-pressure reservoirs with low-pressure maintenance valves are known from the prior art, such as International Patent Disclosure WO 2005/010351. These known systems predominantly involve piezoelectric injectors with hydraulic couplers for stroke boosting and temperature compensation, which to refill the coupler require a pressure in the return branch of approximately 10 bar. For reasons of cost and simplicity, this pressure is generated by combining the leak fuel lines of the injectors into a leak fuel rail, and the diverted quantity from the injectors flowing out via this leak fuel rail is carried via a mechanical pressure maintenance valve and dammed up there to a pressure of approximately 10 bar.

One discovery of the present invention accordingly comprises using this damming up of the pressure by the at least one pressure maintenance valve simultaneously for building up a requisite metering pressure and thus to replace a low-pressure pump for the metering. Preferably, the at least one pressure maintenance valve is embodied such that the pressure that can be maintained in the at least one low-pressure reservoir does not exceed a predetermined maximum pressure. Preferably, the pressure is set to between 5 bar and 20 bar, and especially preferably to 10 bar.

The fuel injection system according to the invention furthermore has a device for posttreating exhaust gases of the engine in an exhaust system. Especially preferably, this device in turn has a filter, in particular a particle filter, preferably an NOx particle filter and/or a soot particle filter, and/or a catalytic converter, in particular a storage catalytic converter, preferably an NOx storage catalytic converter.

In addition, at least one metering device for metered introduction of fuel into the exhaust system is provided in the fuel injection system. This at least one metering device communicates fluidically with the at least one low-pressure reservoir, and preferably no additional low-pressure pump for attaining a metering pressure is provided. The at least one metering device preferably has at least one metering valve.

The at least one metering device can preferably be located in an exhaust manifold of the exhaust system. This assures that especially efficient atomization and distribution of the metered-in fuel takes place in the exhaust system. Moreover, this arrangement assures that safe, reliable cracking of the fuel, in particular diesel fuel, takes place in the hot exhaust gas. The metered-in fuel, as in the prior art, serves to regenerate the at least one device for posttreating the exhaust gases and/or for reinforcing the posttreatment. For instance, the metered-in fuel, by combustion in the device for posttreating exhaust gases, can briefly assure a temperature elevation there, and soot particles, for instance, are burned off and eliminated in the form of carbon dioxide.

This combustion can additionally be reinforced by one or more heating devices in the device for posttreating the exhaust gases, which preferably cooperates with the metering in of fuel into the exhaust system. Thus by means of this heating device, the temperature can briefly be elevated, in order to reinforce the reaction of the metered-in fuel with the contaminants.

In addition, the metered-in fuel can also act as a reducing agent; preferably, cracking (for instance, thermally reinforced cracking) of the metered-in fuel takes place, so as to make an especially effective reducing agent available for reducing NOx, for example. This process too can be additionally reinforced by means of a heating device.

The injection of fuel into the exhaust system can be done periodically for instance, such as once per cycle of the engine. Alternatively or in addition, however, special injections may be provided at predetermined or variable intervals, for instance every 10 km or every 1000 km, by means of which a special regeneration process is initiated. For the permanent injection into the exhaust system to reinforce the exhaust gas preparation on the one hand and for a regeneration injection on the other, for example, different injection quantities may be provided. This injection may for instance be controlled by an engine control unit. It is also possible for a plurality of injection sites to be provided, which are employed for instance at different times and for different purposes.

It is especially preferable if the at least one metering device and the at least one low-pressure reservoir, fluidically communicating with the at least one metering device, are adapted to one another. This can be done for instance by providing a pressure measurement system in the at least one low-pressure reservoir or other component of the low-pressure part, for detecting the pressure in the at least one low-pressure reservoir. Still other measuring systems may be provided, such as temperature measuring systems, which detect the fuel temperature in the at least one low-pressure reservoir. The use of a pressure measurement system has proved especially advantageous in collaboration with a further advantageous feature of the invention in which the at least one pressure maintenance valve has a throttle bore, and in particular is embodied as a throttle bore.

The at least one metering device can be adapted to these parameters of the fuel in the at least one low-pressure reservoir, for which purpose a control unit (for instance the engine control unit) can be used. Thus the at least one metering device can for instance be controlled by the control unit as a function of the detected pressure in the at least one low-pressure reservoir. In particular, it is possible in this way for the metering duration, such as the opening duration of a metering valve, to be adapted to the pressure detected in the low-pressure reservoir. It can be assured in this way that the injection quantity does not exceed and/or fall short of predetermined tolerances. The metering can also be done as a function of the fuel temperature; at elevated fuel temperature, for instance (and thus at elevated reactivity of the fuel), only a lesser fuel quantity can then be metered in. Once again, this increases the efficiency of the fuel injection system for preparing the exhaust gases.

The fuel injection system of the invention, in one of the embodiments described above, has numerous advantages over conventional fuel injection systems known from the prior art. In particular, as already described above, it is possible to dispense with the use of a low-pressure pump for metering fuel. As a result, fewer assembly steps are needed, and the system can be designed in a more space-saving, economical way. Numerous electrical or electronic controls for the metering pump can also be dispensed with. In this way, low-cost solutions are attainable even for instance in piezoelectric common rail injection systems. Naturally, the fuel injection system of the invention can additionally be expanded with a low-pressure pump, but in the sense of the invention this low-pressure pump can be smaller in size than in conventional systems.

A further advantage of the system of the invention is that the fuel, arriving from the tank initially via the high-pressure reservoir, flows via throttles in the fuel injector before reaching the low-pressure reservoir. In the process, this fuel warms up considerably, typically by approximately 60° C., and consequently in the low-pressure reservoir it has a markedly elevated temperature, compared to the tank and/or the high-pressure reservoir. This has multiple advantages, depending on the field in which it is employed.

If the injected fuel is used to reinforce the posttreatment of the exhaust gases, for instance for reducing NOx, then the elevated pressure of the injected fuel causes it to be more reactive and/or more easily converted into reactive reduction media. In the regeneration of devices for posttreating exhaust gases as well, for instance in regeneration of soot particle filters, the elevated temperature of the injected fuel is of considerable advantage.

A further advantage of the system of the invention comprises the homogeneity of the injected fuel in the exhaust system. Dips in the pressure in the low-pressure reservoir from the postinjection via the metering device are not to be expected in present internal combustion engines, especially those with piezoelectric injectors, since the return volumetric flow of fuel, returning from the fuel injectors via the low-pressure reservoir, exceeds the quantity required for the postinjection in every case. As described above, depending on the control precision of the pressure maintenance valve at the low-pressure reservoir, the pressure in the low-pressure reservoir can optionally be detected by the engine control unit in addition and used for calculating the triggering duration of the metering device. In this way, the uniformity of the postinjection is additionally enhanced.

BRIEF DESCRIPTION OF THE DRAWING

The invention will be described in further detail below in conjunction with the drawings, in which.

DESCRIPTION OF THE PREFERRED EMBODIMENTS

Figure 1:
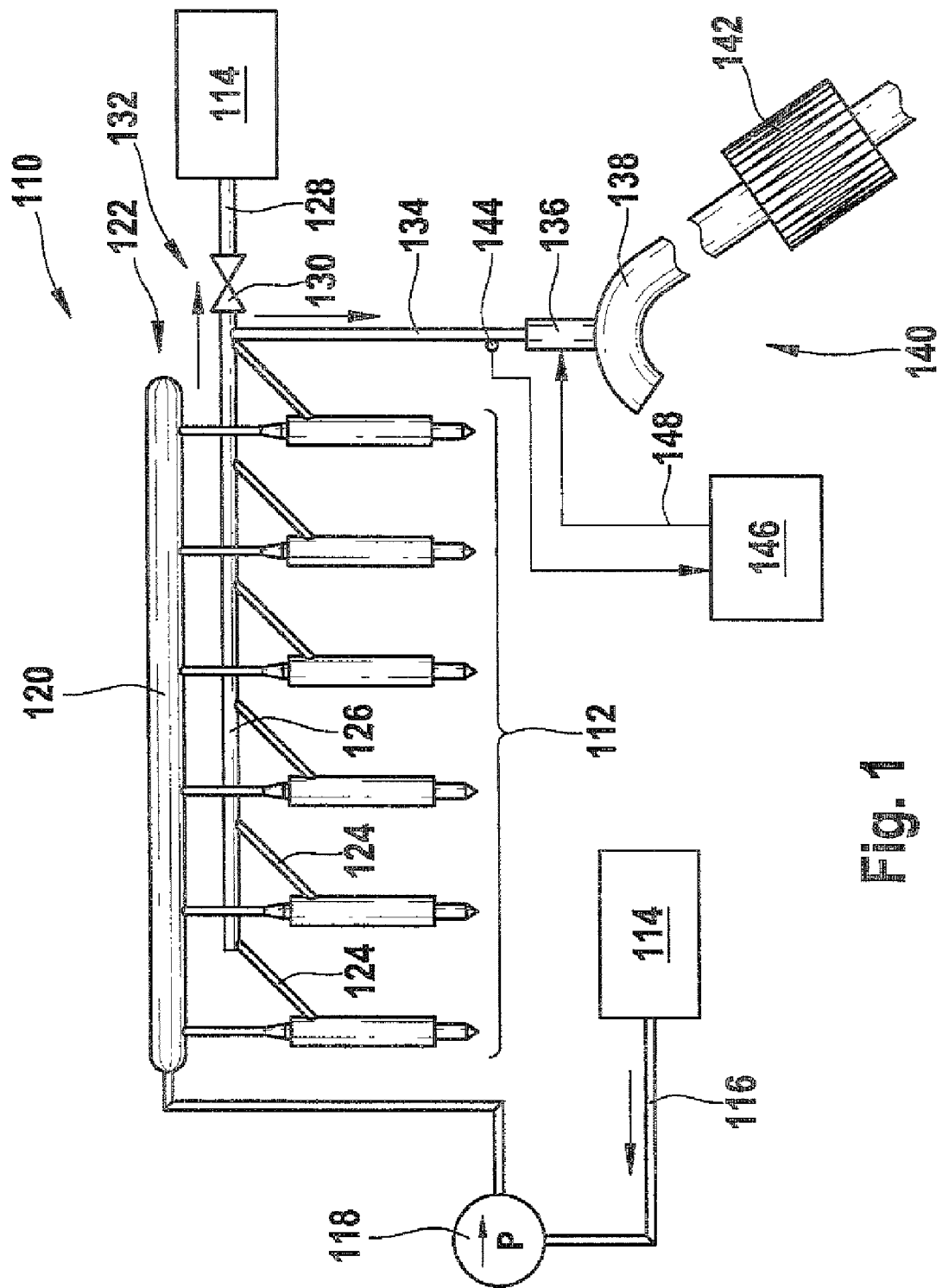
FIG. 1 shows a fuel injection system of the invention without an additional metering pump for postinjection of fuel.

In the sole drawing (FIG. 1), a fuel injection system of the invention is shown in an especially preferred embodiment. This is a so-called HCI system that is employed for regenerating a particle filter.

The fuel injection system 110 has a bank (represented symbolically) of fuel injectors 112, by means of which fuel can be injected into combustion chambers of the internal combustion engine. In this exemplary embodiment, let it be assumed that these fuel injectors 12 are common rail piezoelectric fuel injectors. From a fuel tank 114 via a fuel line 116 and a high-pressure pump 118, fuel is pumped into a high-pressure reservoir 120 (common rail). This high-pressure reservoir 120 is part of a high-pressure part 122 of the fuel injection system. From the high-pressure reservoir 120, in which a pressure of between 200 bar and 2000 bar typically prevails, the fuel injectors 112 are acted upon by fuel for the injection.

As is known from the prior art, the fuel injectors 112 each have return branches 124, which in this exemplary embodiment are combined in a low-pressure reservoir 126 in the form of a return rail. Via a low-pressure outlet 128, fuel is returned from the low-pressure reservoir 126 to the fuel tank 114.

The return branches 124 and the low-pressure reservoir 126 thus form components of a low-pressure part 132 of the fuel injection system 110. Between the low-pressure reservoir 126 and the low-pressure outlet 128, a pressure maintenance valve 130 is provided. This pressure maintenance valve 130 is embodied such that the pressure in the low-pressure reservoir 126 is set to approximately 10 bar.

A metering line 134 is moreover provided, which branches off from the low-pressure reservoir 126 and leads to a metering device 136 in the form of a metering valve. Still other embodiments are conceivable, such as a direct connection of the low-pressure reservoir 126 to the metering device 136, without the interposition of a metering line 134.

The metering device 136 is let into an exhaust manifold 138 of an exhaust system 140 of the engine. The metering device 136 is embodied such that the fuel can be injected from the metering line 134 into the exhaust system 140. The exhaust system 140 in this exemplary embodiment furthermore has a device 142 for posttreating the exhaust gases in the exhaust system 140; it is embodied here as a particle filter. The fuel injected via the metering device 136 causes soot to burn off in the particle filter 142 and thus brings about regeneration of this particle filter.

The fuel injection system of the invention in the embodiment shown in FIG. 1 furthermore has a pressure measurement system 144, in the form of a pressure sensor, which furnishes information about the pressure in the low-pressure part 132 to a control unit 146. The control unit 146, via a control line 148, controls the metering behavior of the metering device 136, and in particular the opening and closing of a metering valve of the metering device 136. In this way, regeneration of the particle filter 142 can take place, for instance at regular intervals.

The foregoing relates to the preferred exemplary embodiments of the invention, it being understood that other variants and embodiments thereof are possible within the spirit and scope of the invention, the latter being defined by the appended claims.

The invention claimed is:

1. A fuel injection system for an internal combustion engine, comprising:
    a high-pressure part having at least one high-pressure reservoir delivering fuel to at least one fuel injector;
    a low-pressure part having at least one low-pressure reservoir which is in communication with the at least one fuel injector so that it receives fuel from the at least one fuel injector;
    at least one pressure maintenance valve maintaining pressure in the at least one low-pressure reservoir;
    at least one device for posttreatment of exhaust gases of the engine, the posttreatment device disposed in an exhaust system of the internal combustion engine; and
    at least one metering device for metered introduction of fuel into the exhaust system; wherein the at least one metering device is in hydraulic communication with the at least one low-pressure reservoir.

2. The fuel injection system according to claim 1, wherein the at least one pressure maintenance valve is embodied such that the pressure that can be maintained in the at least one low-pressure reservoir does not exceed a predetermined maximum pressure.

3. The fuel injection system according to claim 1, wherein the at least one low-pressure reservoir has a communication between the at least one low-pressure reservoir and the at least one metering device, and the at least one metering device has no additional pump.

4. The fuel injection system according to claim 1, further comprising a pressure measurement system for detecting the pressure in the at least one low-pressure part.

5. The fuel injection system according to claim 1, further comprising at least one control unit, the control unit being equipped to control the at least one metering device, as a function of the detected pressure in the at least one low-pressure part.

6. The fuel injection system according to claim 1, wherein the at least one device for posttreatment of exhaust gases of the engine is embodied by one of a filter and a catalytic converter.

7. The fuel injection system according to claim 1, wherein the at least one device for posttreatment of the exhaust gases has at least one heating device.

8. The fuel injection system according to claim 1, wherein the at least one pressure maintenance valve has a throttle bore.

9. The fuel injection system according to claim 1, wherein the at least one metering device has at least one metering valve.

10. The fuel injection system according to claim 9, wherein the at least one metering device is disposed in an exhaust manifold of the exhaust system.

11. The fuel injection system according to claim 9, wherein the pressure that can be maintained in the at least one low-pressure part is between 5 bar and 20 bar, preferably 10 bar.

12. The fuel injection system according to claim 9, wherein the at least one low-pressure reservoir has a communication between the at least one low-pressure reservoir and the at least one metering device, and the at least one metering device has no additional pump.

13. The fuel injection system according to claim 9, further comprising a pressure measurement system for detecting the pressure in the at least one low-pressure part.

14. The fuel injection system according to claim 1, wherein the at least one metering device is disposed in an exhaust manifold of the exhaust system.

15. The fuel injection system according to claim 14, wherein the pressure that can be maintained in the at least one low-pressure part is between 5 bar and 20 bar, preferably 10 bar.

16. The fuel injection system according to claim 1, wherein the pressure that can be maintained in the at least one low-pressure part is between 5 bar and 20 bar, preferably 10 bar.

17. The fuel injection system according to claim 16, wherein the at least one low-pressure reservoir has a communication between the at least one low-pressure reservoir and the at least one metering device, and the at least one metering device has no additional pump.

18. The fuel injection system according to claim 17, further comprising a pressure measurement system for detecting the pressure in the at least one low-pressure part.

19. The fuel injection system according to claim 17, wherein the at least one device for posttreatment of exhaust gases of the engine is embodied by one of a filter and a catalytic converter.

20. The fuel injection system according to claim 17, wherein the at least one device for posttreatment of the exhaust gases has at least one heating device.

* * * * *